United States Patent Office 2,795,772
Patented June 11, 1957

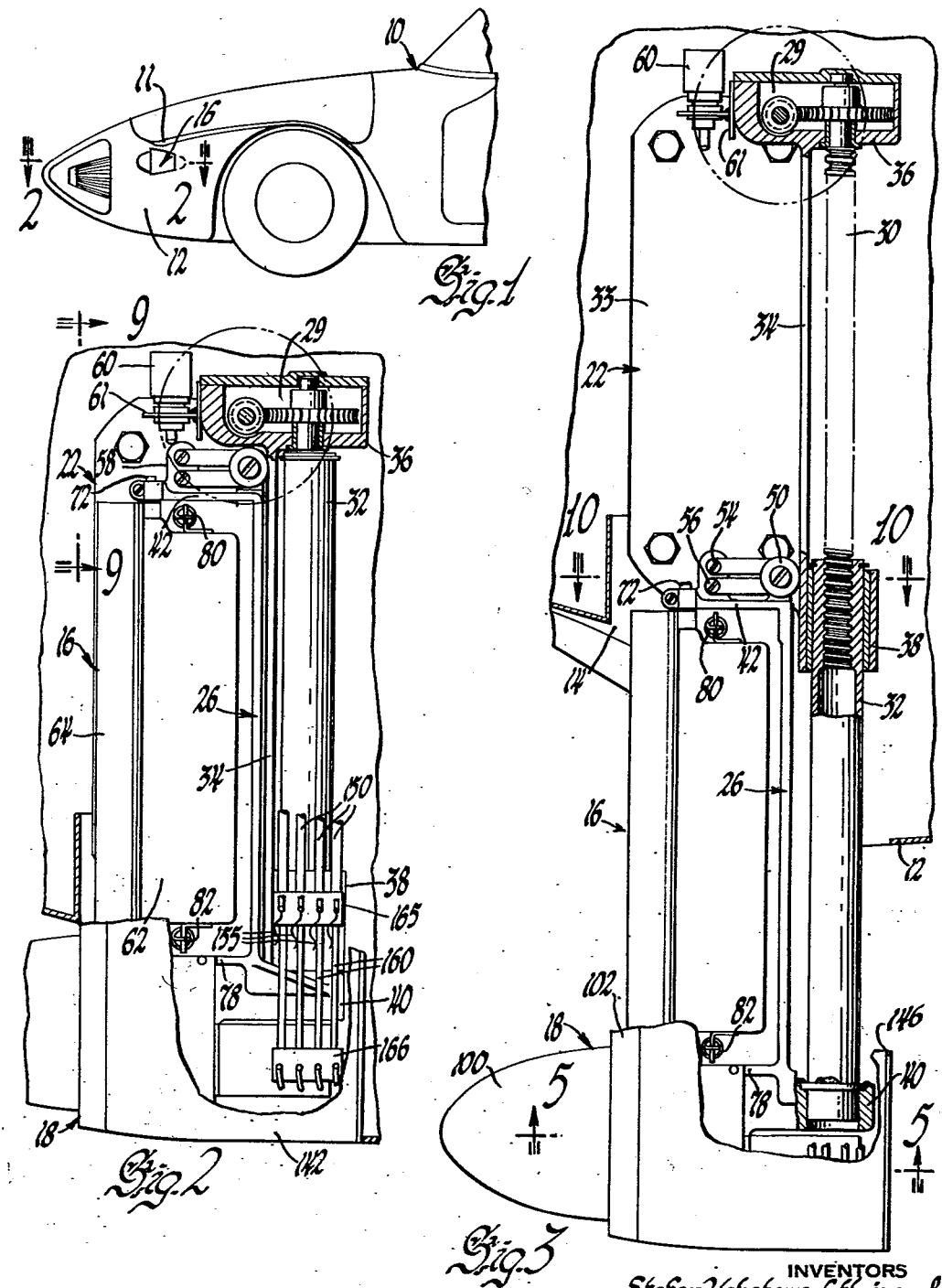

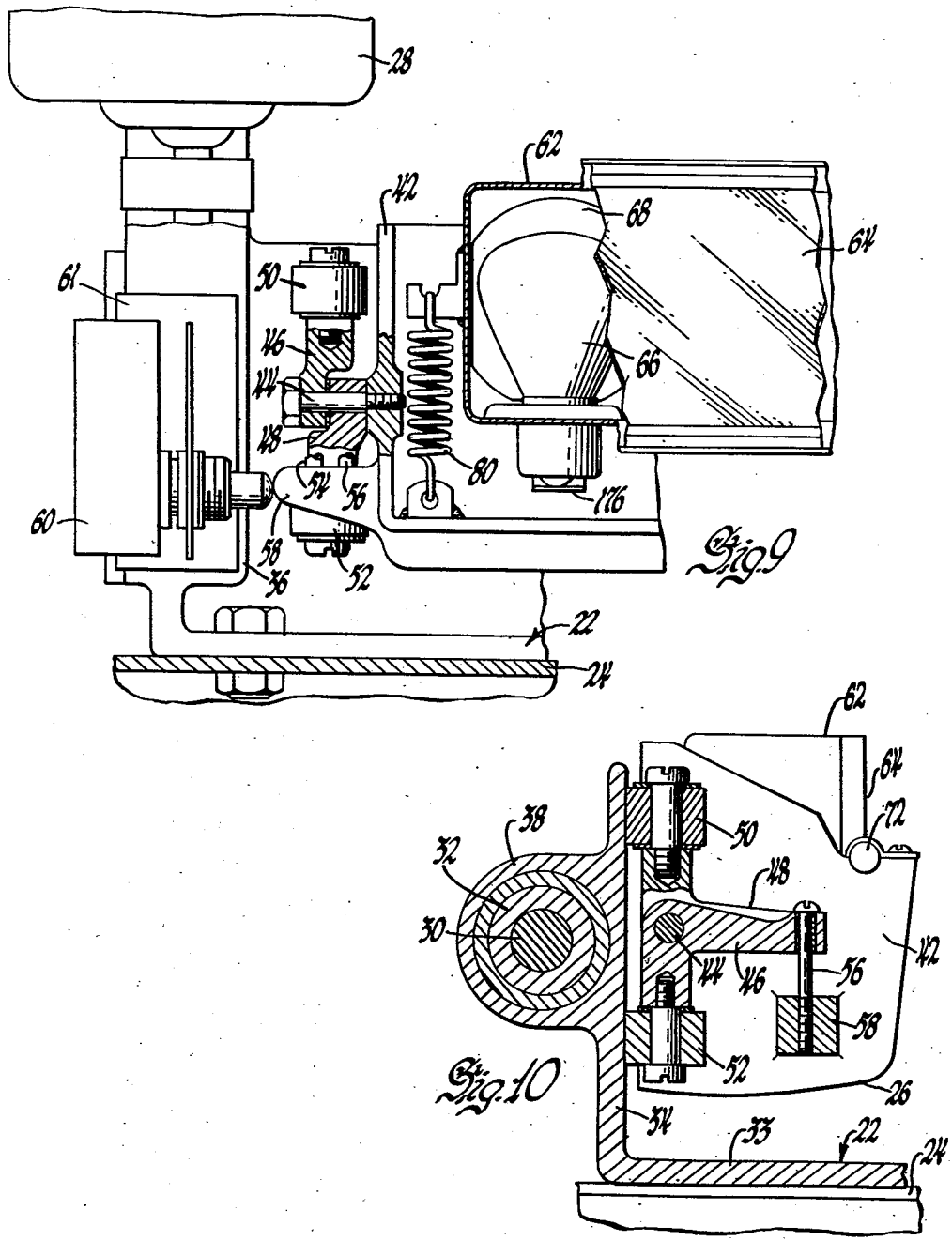

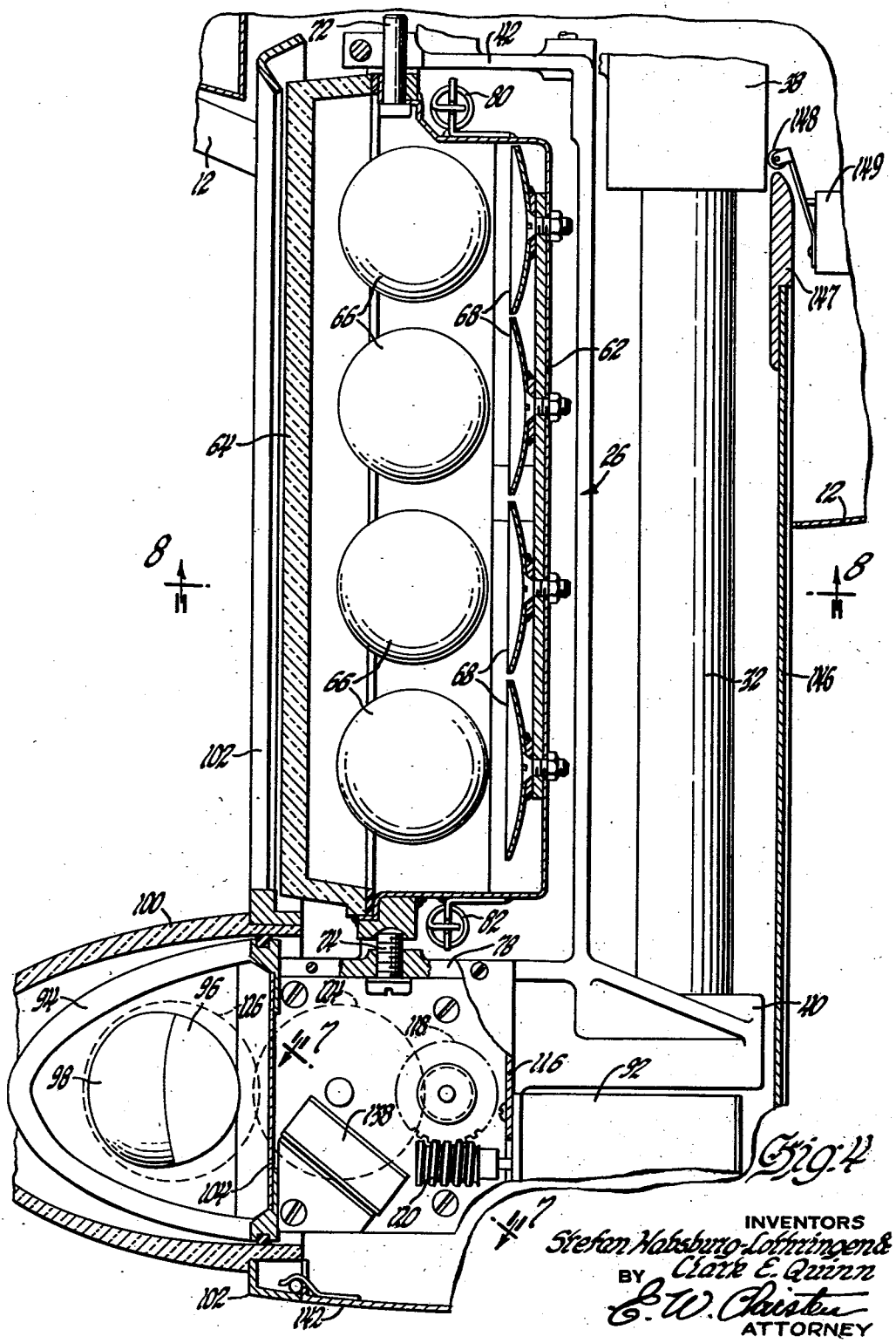

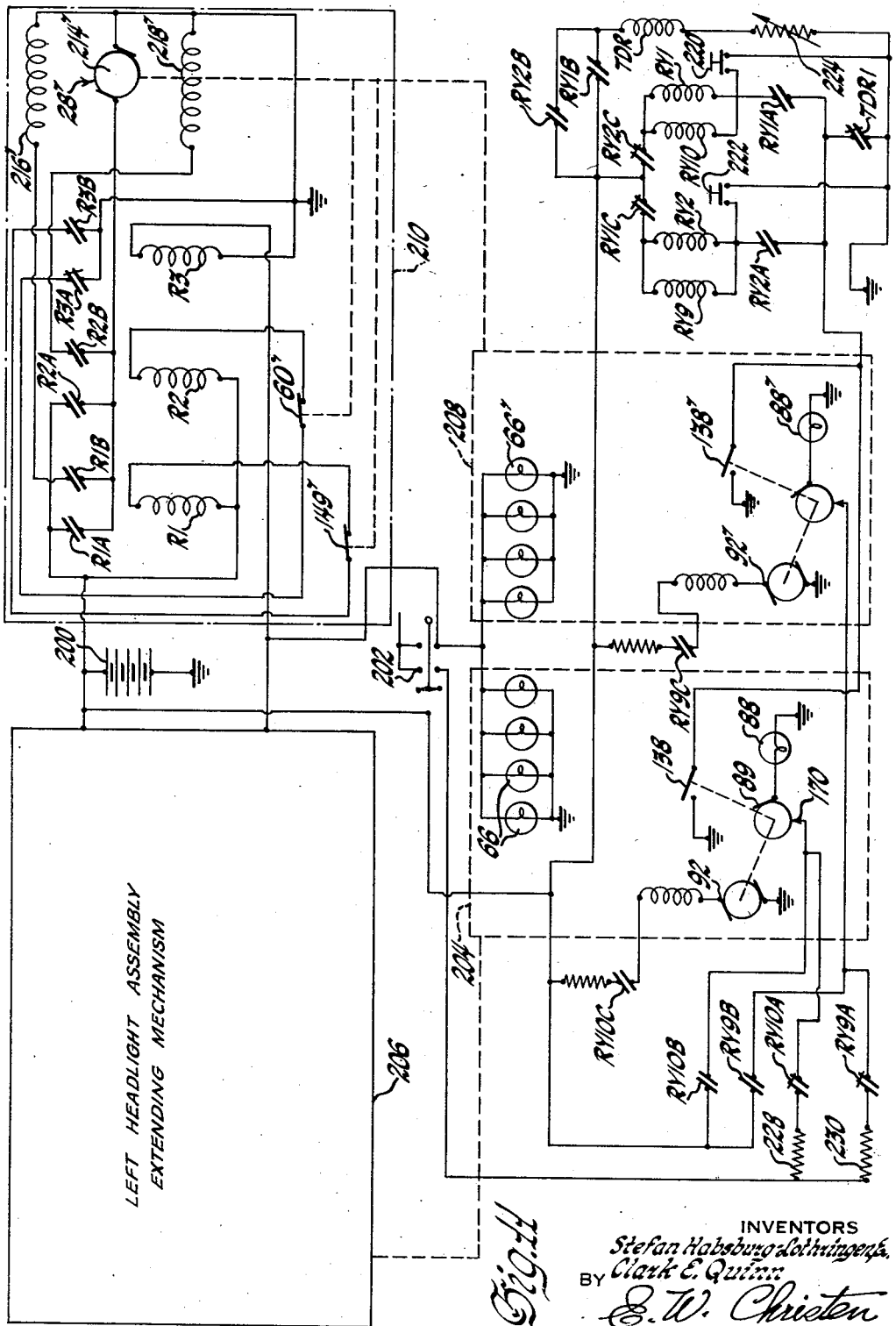

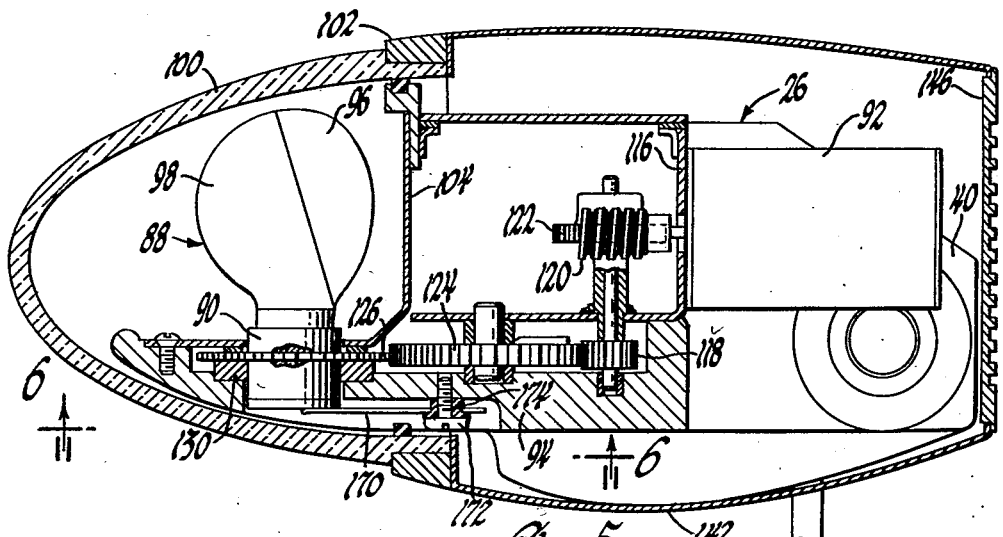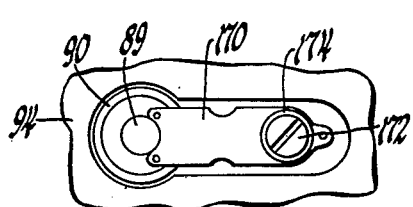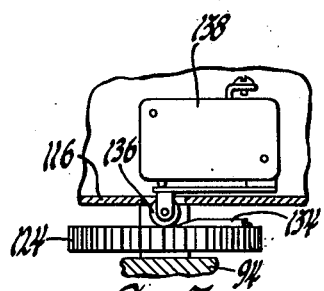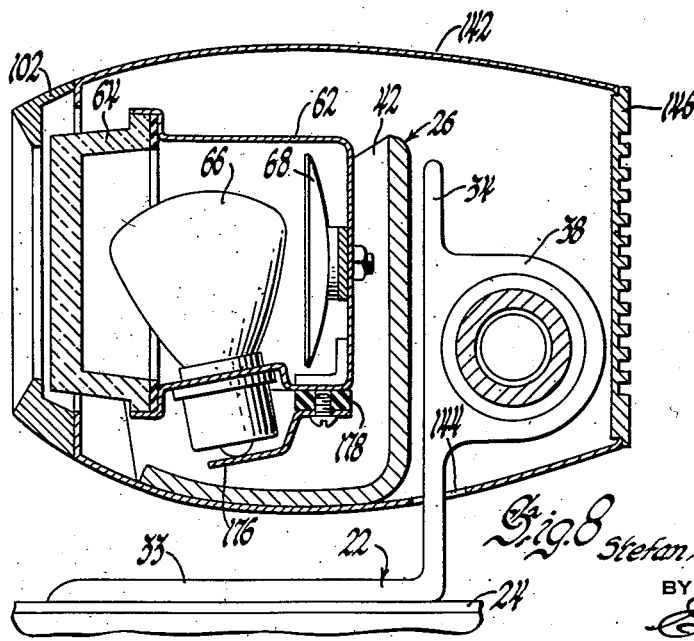

2,795,772

VEHICLE RETRACTABLE LAMP

Stefan Habsburg-Lothringen and Clark E. Quinn, Royal Oak, Mich., assignors to General Motors Corporation, Detroit, Mich., a corporation of Delaware Application January 17, 1956, Serial No. 559,620

8 Claims. (Cl. 340—87)

This invention relates to an automatically extensible and retractable vehicle headlamp and directional signal lamp system, and to a rotating directional or turn signal lamp system, the lamps of which are adapted to provide the functions of both a parking lamp and a turn signal indicator.

The invention has for its general object to provide a vehicle illumination system of the above general character in which the vehicle headlamps are automatically moved laterally outwardly through a panel opening in the vehicle body to an extended position when the headlamps are energized and are automatically retracted to a normally concealed position within the vehicle body when they are de-energized.

Another object is to provide a vehicle illumination and directional signal system in which the left and right front directional signal lamps are automatically extended and retracted with the headlamps and form a closure covering the panel opening through which the headlamps are extended and retracted when the headlamps are in their concealed retracted position.

Another object is to provide a directional signal system in which the directional signal lamps are selectively actuable and rotatably driven to provide a wide sweeping directional or turn signal beam that is readily observable over a wide area.

A related object is to provide a rotary directional signal lamp system of the above character in which the directional signal lamps may also be operated as vehicle parking lamps.

A specific object is to obtain a parking light function and a rotary turn signal function from a lamp bulb which is rotatably driven when operating as a turn signal indicator, but is stationary when operating as a parking lamp.

A related, specific object is to provide a control system for a combined parking light and rotary directional signal system of the above character to assure that the rotatable lamp bulb will come to rest at a predetermined position upon completion of a cycle of operation of the rotary directional signal system so as to provide a stationary, forwardly directed beam when the lamp is operated as a parking light.

The above and other objects, together with the features and advantages of the invention will appear more fully from the following detailed description and drawings in which:

Fig. 1 is a left side elevation view of the forward portion of an automobile vehicle embodying an extensible and retractable vehicle headlamp and directional signal lamp assembly in accordance with the present invention;

Figs. 2 and 3 are top plan views with parts broken away taken in the direction 2—2 of Fig. 1 showing the left headlamp and direction signal lamp assembly in their retracted and extended positions, respectively;

Fig. 4 is an enlarged, detailed, sectional view of Fig. 3;

Fig. 5 is a longitudinal sectional view taken in the direction 5—5 of Fig. 3 showing the interior of the directional signal lamp and associated drive mechanism therefor;

Fig. 6 is a view taken in the direction 6—6 of a part of Fig. 5;

Fig. 7 is a view taken in the direction 7—7 of a part of Fig. 4;

Fig. 8 is a longitudinal, sectional view taken in the direction 8—8 of Fig. 4;

Fig. 9 is a view taken in the direction 9—9 showing a part of the apparatus of Fig. 2;

Fig. 10 is a view taken in the direction 10—10 of a part of the apparatus of Fig. 3; and Fig. 11 is a schematic electrical circuit diagram of the electrical control system for the apparatus of the present invention.

Referring to the drawings, Fig. 1 illustrates the forward portion of an automotive vehicle 10 in which there is installed a pair of retractable headlamp and directional signal lamp assemblies of the present invention. The vehicle is shown as having a clam shell type fender 11 projecting laterally from a generally vertically extending side panel 12. Only the left side of the vehicle and one of the retractable lamp assemblies is shown, it being understood that a pair of such lamp assemblies are provided, one on each side near the forward end of the vehicle. The side panel 12 of the vehicle defines an opening 14 therein below the fender 11 through which opening the headlamp, indicated generally at 16, is extended and retracted. The left front turn signal lamp is shown generally at 18 and provides a closure for the panel opening 14 when the headlamp assembly is in its retracted position.

The mechanism by means of which the headlamp is extended and retracted includes a fixed support bracket 22, which is mounted on a horizontal shelf panel 24 within the body of the vehicle, and a movable carriage 26, which mounts the headlamp and turn signal lamps and is driven through a gear train 29 by a reversible drive motor 28, lead screw 30 and travelling nut 32.

The support bracket 22 is a one-piece casting having a horizontally disposed portion 33 bolted to the shelf 24, a vertically extending portion 34 and an integrally formed, vertically extending channel-shaped portion 36 at the inner end thereof forming a bearing support for the lead screw, as shown in Fig. 3. The outer end of the vertically extending portion 34 has an integrally formed shaft and bearing support 38 thereon that receives the travelling nut 32 which is shown as a laterally extending, horizontally disposed tube, the inner end of which has an internally threaded portion that coaxially receives the lead screw 30. The outer end of the tube is received in and welded to a rearwardly offset bracket portion 40, which is an integral part of and is located at the outer end of the carriage 26, and thus supports the carriage from the fixed support 22.

The carriage 26 is a one-piece casting having an elongated, generally box-shaped portion that is open at its top and along its front and is spaced from the fixed support 22 as shown in Fig. 10. The side wall 42 at the inner end of the carriage casting mounts a pivot 44 for a pair of bell crank levers 46 and 48. One end of an arm of each bell crank lever has a roller 50, 52 rotatably mounted thereon that engages the forward face of the vertically extending portion 34 of the fixed support bracket 22. The end of the other arm of each bell crank lever is attached through suitable tensioning means, which include the screws 54, 56 that are threadably received in an integrally formed boss portion 58 on the inner end wall 42 of the carriage for tensioning the rollers against the support bracket. The boss 58 extends inwardly of the vehicle from the side wall 42 of the carriage and engages a limit switch 60, which is mounted on a T-shaped bracket 61 welded to the section 36 of the fixed support 22 and functions to interrupt the energization of the carriage drive motor 28 when the carriage is in its fully retracted position shown in Figs. 2 and 9.

The headlamp structure includes an elongated, box-shaped lamp body 62 having a rectangular front opening defined therein and mounts a transparent lens 64 with a flat rectangular face spaced from the back of the body. Enclosed within the lamp body are four lamp bulbs 66, the axes of which are inclined slightly to the vertical, and dished reflectors 68, which are supported from the back of the lamp body. For beam aiming purposes the lamp body of each headlamp is pivotally mounted as shown at 72 and 74 on the spaced side wall portions 42 and 78 of the carriage casting, and is provided with a pair of springs 80 and 82 which are attached to the inner and outer side walls of the lamp body and to the bottom wall portion of the carriage casting and cooperate with a vertically disposed adjustment screw or stop, which is mounted in the bottom wall of the carriage and contacts the bottom wall of the lamp body near the back thereof.

As best shown in Fig. 5, the directional signal lamp structure of the headlight assembly on each side of the vehicle includes a one-sided lamp bulb 88 which is mounted in a rotatable bulb retainer or socket 90 driven through a gear train by a unidirectional drive motor 92, all of which are supported from or mounted on a forwardly extending, generally dish-shaped portion 94 forming an integral part of and located at the outer end of the carriage casting. The lamp bulb 88 is of the partially silvered or reflecting variety having an opaque, silvered, reflecting portion 96 and a clear or transparent portion 98, and is shown in its stationary or rest position with its clear surface portion 98 facing in a forward direction in which position the lamp may be used to provide a parking light function. The bulb is shown enclosed within a lamp housing or chamber defined by a conical or bullet-shaped, translucent lens 100, which is received within a bezel 102, and a lamp inner housing or bracket member 104 mounted on the forward portion of carriage casting section 94.

The motor 92 is mounted on an L-shaped bracket 116 that is supported on the carriage casting section 94 and drives a gear 118 through a worm 120 and pinion 122. Gear 118 drives an idler gear 124 which, in turn, drives a gear 126 that is brazed to the socket 90. The socket 90 may be of the bayonet type and is press fitted into a thrust washer 130 which is received in an annular recess near the forward end of the carriage casting portion 94. Mounted on the upper face of the idler gear 124 is a cam riser 134 that cooperates with a resiliently mounted roller 136 for an indexing limit switch 138 which forms a part of the control circuit for positioning the lamp bulb in the position shown upon completion of a cycle of operation of the turn indicator system.

The headlamp and directional signal lamp structures are enclosed within an elongated and faired housing 142 which is attached to and carried by the movable carriage as shown in Fig. 8. The bottom wall of the housing is slotted as shown at 144 to prevent mechanical interference with the fixed support 22 when the headlamp structure is retracted within the vehicle body in which position only that portion of the housing which encloses the directional signal lamp structure will project laterally from the vehicle side panel, as shown in Fig. 2. The back end of the sheet metal housing is covered by an ornamental backing plate 146, and its open front end has attached thereto the elongated bezel 102, which frames the rectangular lens 64 of the headlamp structure and the conical lens 100 of the directional signal lamp structure and also provides a support for the lens of the latter structure. The inner end of the housing backing plate 146 has a roller tab 147 mounted thereon that contacts the resiliently mounted roller 148 of a limit switch 149. Switch 149 functions to interrupt the energization of the drive motor 28 when the lamp assembly is in its fully extended position shown in Fig. 4.

In order to supply current to those electrical components of the vehicle headlighting assembly that are carried by the movable carriage of the extending and retracting mechanism, a telescoping, sliding arrangement of stationary guide tubes 150, spring contact fingers 155, and movable conductor rods 160, such as is sketched in Fig. 2, may be employed. The guide tubes, which may be composed of electrically non-conducting material extend parallel to the axis of the traveling nut 32 and may be supported at their outer ends from an insulated terminal board 165 mounted on the vertically extending section 34 of the fixed support 22. The conducting rods 160 are coaxially received within the guide tubes and may be supported at their outer ends from an insulated terminal board 166 mounted on the movable carriage 26 or appending structure, such as the directional signal lamp drive motor 92. The electrical contact fingers 155 are mounted on the stationary terminal board 165 and slidably contact the individual conductor rods 160 to supply current to the bulbs 66 of the headlamp, the directional signal lamp bulb 88, the directional signal lamp drive motor 92, and the index limit switch 138.

Since the bulb 88 is rotated when it is employed as a left front turn signal indicator, another slidable electrical connection is employed therefor in the form of a stationary spring finger 170, which makes a sliding or rubbing contact with the central contact 89 of the rotatable bulb 88 and is supported from the carriage casting section 94 by a screw 172 and insulating grommet 174, as shown in Figs. 5 and 6. Current is supplied to the lamp bulbs of the headlamp from an electrical conductor connected to one of the terminals of the movable terminal board 166 and a spring contact strip 176, which contacts the central contact of each headlamp bulb 66 and is attached to the lamp body through an insulating block 178.

The schematic electrical control circuit diagram of Fig. 11 includes the vehicle battery 200, a three position headlight switch 202, the left headlight assembly 204 and the electrical elements of the extending and retracting mechanism 206 therefor, and the right headlight assembly 208 and the electrical elements of the extending and retracting mechanism 210 therefor. The remaining electrical elements, not enclosed within any of the diagrammatic blocks 204, 206, 208 and 210 are associated with the turn signal indicator control circuit.

Block 206 contains the same electrical elements as block 210, which includes the drive motor 28' and limit switches 60' and 149' corresponding to the heretofore described elements 28, 60 and 149 of the headlighting system associated with the left side of the vehicle, and a first relay R1 having two sets of normally open contacts R1A and R1B, and second relay R2 also having two sets or normally open contacts R2A and R2B, and a third relay R3 having a set of normally closed contacts R3A and a set of normally open contacts R3B. The D. C. drive motor 28' and extending and retracting the right headlight assembly 208 includes an armature 214', a forward field winding 216' which, when energized, causes the motor to drive in a direction to extend the right headlamp assembly and a reverse field winding 218' which causes the motor to retract the assembly.

The left headlight assembly 204 includes the parallel connected bulbs 66 of the left headlamp, the left front turn signal indicator bulb 88, drive motor 92 shown as a D. C. series motor, and the index limit switch 138.

The turn signal control circuit includes a left turn push button 220, right turn push button 222, and a time delay relay TDR having a set of normally closed contacts TDR1 which open after the lapse of a predetermined time interval adjustable by an adjustable resistor 224. Controlled by the left turn signal button 220 is a relay RY1, which has two sets of normally open contacts RY1A and RY1B and a set of normally closed contacts RY1C, and a relay RY10 having a set of normally closed contacts RY10A and two sets of normally open contacts RY10B and RY10C. The right turn signal push button 222 controls a pair of relays RY2 and RY9 having contacts corresponding to those of the relay RY1 and RY10 controlled by the left turn signal button.

The operation of the complete circuit is as follows. Moving the headlight switch 202 on the instrument panel from its first or off position to its second or park position lights the filaments of the left and right front directional signal lamp bulbs 88 and 88' through the voltage dropping dimming resistors 228 and 230 and the normally closed contacts RY10A and RY9A of the relays RY10 and RY9. In this position, the lamp bulbs 88 and 88' provide a parking lamp function.

Moving the switch 202 to its third or headlight position, extinguishes the parking lamps and energizes the bulbs 66 and 66' of the headlamps. Relay R3 is energized to provide a ground connection through its contacts R3B for relay R1 through limit switch 149' which is closed in the retracted position of the headlamps and remains closed until the headlamps are fully extended when relay R1 will be de-energized and drop out its contacts R1A and R1B, thus interrupting the energization of the armature 214' and field 216' to stop the drive motor 28'. Turning off the headlights drops out relay R3 and completes an energizing circuit for reverse relay R2 through the now closed contacts R3A and limit switch 69' whose contacts are closed in the extended position of the headlamps and remain closed until the headlamps are retracted fully within the vehicle body.

Pressing the left turn signal button 220 energizes relays RY1 and RY10 directly from the battery 200 through the normally closed contacts RY2C of relay RY2. Relay RY1 locks in to provide a hold-in circuit through its contacts RY1A and the normally closed contacts TDR1 of relay TDR which becomes energized through RY1B and starts timing out to pick up its contacts TDR1 in, say, about 15 seconds. Contacts RY1C are open during this interval to prevent the opposite turn signal from being energized. All during this interval, the contacts RY10C of relay RY10 are closed to energize the directional signal drive motor 92, which rotates the left front turn signal lamp 88. Contacts RY10A are open and RY10B are closed, putting full battery voltage on the turn signal lamp which is operated at reduced brilliance when functioning as a parking lamp.

When TDR1 has timed out, the directional signal cycle stops provided that the left front indexing switch 138 is open. Switch 138 is operated by the cam riser 134 on the idler gear 124 and is closed except when the one-sided turn signal lamp bulb 88 is pointing forward. Therefore, the turn signal cycle will continue until the lamp bulb is rotated so that its transparent portion 98 is pointing forward and the left indexing switch opens across the now open contacts TDR1 to drop out RY1 and RY10 and turn off the lamp 88 and drive motor 92.

What is claimed is:

1. In an automotive vehicle having a lateral body panel defining an opening therein, an extensible support structure mounted within the vehicle body adjacent the panel opening and movable laterally of said panel from a retracted position within the body to an extended position outside of the body, a headlamp mounted on the extensible structure and concealed within the vehicle body when the structure is in its retracted position, and a directional signal lamp mounted on the extensible structure adjacent the headlamp, drive means coupled to the extensible support structure for extending and retracting it through the panel opening, drive means rotatably coupled to the directional signal lamp to provide a rotary sweeping turn indicator beam, and circuit means including a multiple position control switch which in one position energizes said directional signal lamp as a stationary lamp and in another position energizes said headlamp and drive means for the extensible support structure thereof, and auxiliary switch means energizing said rotatable drive means of said directional signal lamp irrespective of the position of said control switch.

2. In an automotive vehicle including a pair of lamps, one on each side of the vehicle, operable as parking lamps and selectively actuable for operation as rotary turn signal lamps, each of said lamps including a lamp bulb having an opaque portion and a clear portion, drive means rotatably coupled to said lamp bulb to produce a rotary sweeping turn indicator beam, and circuit means including multiple position control switch means operable in one position to energize both of said lamps as parking lamps and selectively actuable switch means operable to energize a selected one of said drive motors for rotating one of said lamps as a turn signal indicator irrespective of the position of said control switch means.

3. Apparatus in accordance with claim 2 above wherein said circuit means includes dimming resistance means connected in series with said lamps when they are stationary and operated as parking lamps.

4. In an automotive vehicle, a directional signal indicator operable as a rotary turn signal lamp and as a parking lamp including a lamp bulb having a clear portion and an opaque portion, the said clear portion of said lamp normally facing in the forward direction of the vehicle when the lamp is stationary, drive means rotatably coupled to said lamp bulb to produce a rotary sweeping turn indicator beam, and circuit means including switch means controlling the energization of said lamp for operation thereof as a parking lamp, auxiliary switch means controlling the energization of said drive motort and said lamp for operation thereof as a turn signal indicator, time delay relay means energizable through said auxiliary switch means and having a pair of normally closed contacts adapted to open after the lapse of a predetermined time and controlling the de-energization of said drive motor, and an indexing limit switch having a pair of normally closed contacts shunting the said contacts of said time delay relay and adapted to be opened once each revolution of said rotatable lamp bulb when the clear portion thereof is facing in a forward direction.

5. A directional signal indicator including a lamp bulb having a clear portion and an opaque portion with the clear portion normally facing in a predetermined direction when the lamp is stationary, drive means rotatably coupled to said lamp bulb to produce a rotary sweeping beam therefrom, control circuit means including switch means controlling the energization of said drive motor and said lamp, time delay relay means energizable through said switch means and having a pair of normally closed contacts adapted to open after the lapse of a predetermined time and controlling the de-energization of said drive motor, and an indexing limit switch having a pair of normally closed contacts shunting the said contacts of said time delay relay and adapted to be opened once each revolution of said rotatable lamp bulb when the clear portion thereof is facing in said predetermined direction.

6. In an automotive vehicle having a lateral body panel defining an opening therein, an extensible support structure mounted within the vehicle body adjacent the panel opening and moveable laterally of said panel from a retracted position within the body to an extended position outside of the body, a head lamp mounted on the extensible structure and concealed within the vehicle body when the structure is in its retracted position, a signal lamp mounted on the extensible structure adjacent the head lamp, said signal lamp forming a closure for the panel opening when the head lamp is in its concealed retracted position within the vehicle body, drive means rotatably coupled to said signal lamp to provide a rotary sweeping turn indicator beam, and circuit means for energizing said signal lamp as a stationary lamp and selectively operable to energize said rotatable drive menas to provide a rotary sweeping turn indicator beam.

7. In an automotive vehicle including a pair of lamps, one on each side of the vehicle, operable as parking lamps and selectively actuable for operation as rotary turn signal lamps, each of said lamps including a lamp bulb having an opaque portion and a clear portion, drive means coupled to said lamp bulb to produce a rotary sweeping turn indicator beam, and circuit means to energize both of said lamps as parking lamps and operable to energize a selected one of said drive means for rotating one of said lamps as a turn signal indicator.

8. In an automotive vehicle including a pair of lamp structures, one on each side of the vehicle, operable as parking lamps and selectively actuable for operation as rotary turn signal lamps, each of said lamp structures including a bulb and means for projecting the beam thereof in substantially one general direction in any one position of said structure, drive means coupled to said lamp structures to produce a rotary sweeping turn indicator beam, and circuit means to energize both of said lamps as parking lamps and operable to energize a selected one of said drive means for rotating one of said lamp structures as a turn signal indicator.

References Cited in the file of this patent

UNITED STATES PATENTS

| | | |
|---|---|---|
| 1,500,601 | Brewster | July 8, 1924 |
| 1,890,379 | Haddad | Dec. 6, 1932 |
| 2,644,152 | Ginsberg | June 30, 1953 |
| 2,719,282 | Roth | Sept. 27, 1955 |

FOREIGN PATENTS

| | | |
|---|---|---|
| 629,784 | Germany | Jan. 5, 1935 |